United States Patent

Hemphill et al.

[11] Patent Number: 5,812,974
[45] Date of Patent: Sep. 22, 1998

[54] SPEECH RECOGNITION USING MIDDLE-TO-MIDDLE CONTEXT HIDDEN MARKOV MODELS

[75] Inventors: Charles T. Hemphill, Coppell; Lorin P. Netsch, Allen; Christopher M. Kribs, Dallas, all of Tex.

[73] Assignee: Texas Instruments Incorporated, Dallas, Tex.

[21] Appl. No.: 631,731

[22] Filed: Apr. 10, 1996

Related U.S. Application Data

[63] Continuation of Ser. No. 38,581, Mar. 26, 1993.

[51] Int. Cl.[6] ........................................ G10L 1/00
[52] U.S. Cl. ............................................ 704/256
[58] Field of Search ................... 395/2.5, 2.64, 395/2.65, 2.66; 704/241, 255, 256, 257

[56] References Cited

U.S. PATENT DOCUMENTS

| | | | |
|---|---|---|---|
| 4,349,700 | 9/1982 | Pirz et al. | 395/2.5 |
| 4,695,962 | 9/1987 | Goudie | 395/2.76 |
| 4,833,712 | 5/1989 | Bahl et al. | 395/2.52 |
| 5,457,770 | 10/1995 | Miyazawa | 395/2.64 |
| 5,475,796 | 12/1995 | Iwata | 395/2.69 |
| 5,566,270 | 10/1996 | Albesano et al. | 395/2.41 |
| 5,594,834 | 1/1997 | Wang | 395/2.62 |
| 5,596,680 | 1/1997 | Chow et al. | 395/2.57 |

*Primary Examiner*—David R. Hudspeth
*Assistant Examiner*—Susan Wieland
*Attorney, Agent, or Firm*—Robert L. Troike; Wade James Brady, III; Richard L. Donaldson

[57] ABSTRACT

This is a speech recognition method for modeling adjacent word context, comprising: dividing a first word or period of silence into two portions; dividing a second word or period of silence, adjacent to the first word, into two potions; and combining last portion of the first word or period of silence and first portion of the second word or period of silence to make an acoustic model. The method includes constructing a grammar to restrict the acoustic models to the middle-to-middle context.

16 Claims, 2 Drawing Sheets

SPEECH RECOGNITION USING MIDDLE-TO-MIDDLE CONTEXT HIDDEN MARKOV MODELS

This is a continuation of application Ser. No. 08/038,581 filed Mar. 26, 1993.

FIELD OF THE INVENTION

This invention generally relates to speech recognition.

BACKGROUND OF THE INVENTION

Without limiting the scope of the invention, its background is described in connection with speech recognition.

Many potential applications of automatic speech recognition require high-performance recognition of small vocabularies. One example is utterances that only consist of a string of digits ("zero" through "nine"). When the words are spoken in a natural manner, there are several difficulties presented to the speech recognized. These include a large amount of coarticulation context between words and the short duration of many word pronunciations. For example, the digit "eight" will have different leading and trailing acoustic realizations. In the uttrances "three eight" and "four eight", the leading phone of the "eight" is colored by the preceding phone. In the uttences "eight oh", "eight nine", and the isolated word "eight", typically, the "t" will flap, will be unreleased, or will burst. In order to achieve high-performance, the automatic speech recognizer must model the coarticulation effects due to context.

Modeling of words has been performed in a variety of ways. In recent art, the method of Hidden Markov Modeling (HMM) has been used with much success. HMMs represent words by a sequence of states. A unique acoustic observation probability density maps to each state of the HMM. The allowed transitions between states are defined by transition arcs with associated probabilities. The combination of states, acoustic densities and transitions define the word model. An example is in FIG. 1.

Multiple Density Mapping

One method of incorporating context maps multiple acoustic observation densities to each state of an HMM. The multiple densities mapped to a state are often called "mixture densities". Using the previous example of the word "eight" and the HMM model of FIG. 1, states at the end of the word model could have multiple associated acoustic densities representing a flapping sound, a burst, or an unreleased sound. Thus the word model contains the separate contexts of "eight" previously described. The advantage of this method is that if there are N words in the vocabulary, then only N models need to be made. However, with "mixture density" models by themselves there is no way to force the word model to use the appropriate acoustic density based on the preceding and following spoken word. This results in uncertainty and may compromise recognizer performance. Reference to the multiple density mapping model can be found in L. R. Rabiner, "A Tutorial on Hidden Markov Models and Selected Applications in Speech Recognition", Proceedings of the IEEE, vol. 77, no. 2, pp. 257–286, February 1989.

Multiple Context-Dependent Models

A way to solve the limitation of "mixture density" modeling mentioned above is to create separate word models for each possible context. One could, for example, create a model for the word "eight" for each possible preceding and trailing digit. The recognizer could then use a grammar that forces the use of each digit only in the proper context. The problem with this approach is that for a vocabulary of N words $N^3$ models must be made. This results in a large number of models, the need for large amounts of data to train the models, and requires significantly more processing time to perform recognition. The number of word models could be reduced by clustering the word models. That is, finding which of the $N^3$ models are similar, and combine those contexts into a single word model. Reference to the multiple context-dependent model can be found in L. R. Rabiner, C. H. Lee, B. H. Juang, and J. G. Wilpon, "HMM Clustering for Connected Word Recognition", Proceedings of ICASSP '89, vol. 1, pp. 405–408, May 1989.

Diphone and Triphone Modeling

Instead of modeling a whole word as a single HMM, one could model sub-word units as HMMs. The sub-word units could then be chosen to represent the coarticulation acoustics occurring between sounds in a word and between words. In particular, prior art has defined diphone units and triphone units as HMMs that model the transition between one phonetic sound and another. These sub-word units can be constrained by a grammar to model words in coarticulatory context. Reference to the diphone model is in D. B. Paul, "The Lincoln Robust Continuous Speech Recognizer", Proceedings of ICASSP '89, vol. 1, pp. 449–452, May 1989. Reference to the triphone model is in K. F. Lee, H. W. Hon, M. Y. Hwang, S. Mahajan, and R. Reddy, "The SPHINX Speech Recognition System", Proceedings of ICASSP '89, vol. 1, pp. 445–448, May 1989.

SUMMARY OF THE INVENTION

The invention describes a method of modeling such context by employing an application of HMMs, which provides an efficient method for representing coarticulation between words.

In this invention we create separate HMMs spanning from the middle of a word (or silence) to the middle of a following word (or silence) for each possible combination of words and silence. These models capitalize on the observation that the acoustics at the beginning and ending of words vary significantly with adjacent context, while acoustics in the middle of the word are relatively invariant to context. This invention bypasses the need to create sub-word units such as diphones.

This is a speech recognition method for modeling adjacent word context, comprising: dividing a first word into two portions; dividing a second word or period of silence, adjacent to the first word, into two portions; and combining last portion of the first word and first portion of the second word or period of silence to make an acoustic model.

Further advantages of our invention, its nature and various advantages will be more apparent upon consideration of the attached drawings and following detailed description of the invention.

BRIEF DESCRIPTION OF THE DRAWINGS

The foregoing and further aspects of the invention are illustrated in the accompanying drawings wherein like elements are denoted by like reference designators and in which.

The drawings are schematic and the vertical has been exaggerated for clarity.

DETAILED DESCRIPTION OF PREFERRED EMBODIMENTS

Figure 1:
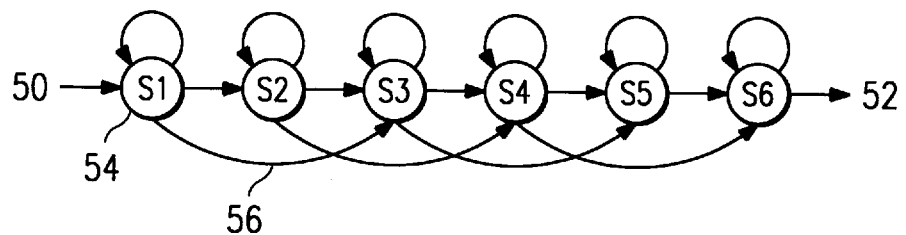
FIG. 1 is a state diagram for a word utilizing the prior art.

FIG. 1 is a state diagram for a word utilizing the prior art for speech recognition. The combination of states S1–S6, acoustic densities and transitions define the word model. The word model is depicted by showing the flow of states from the beginning of the word 50 to the end of the word 52. Each state 54 has a transitional arc 56 attached to it.

Creating Initial Middle-to-Middle Models

We create initial middle-to-middle context HMMs from existing word model HMMs. This is done by concatenating the second part of a word model with the first part of another model. Let M represent the original model i, and the operator "+" represent model concatenation. Then the initial model from the middle of $M_i$ to the middle of $M_j$ is given by:

$$MM_{ij} = SecondPart(M_i) + FirstPart(M_j)$$

The selection of the "Firstart" and "SecondPart" of words is determined by locating acoustic densities in the word models that are stable over context. The resulting middle-to-middle HMMs are capable of modeling the trailing coarticulatory context of one word in the leading context of another word. This means that for a vocabulary of N words, only $N^2$ models must be formed. An illustration of the method using the original word models for "eight" and "oh" is shown in FIGS. 2–4.

Figure 2:
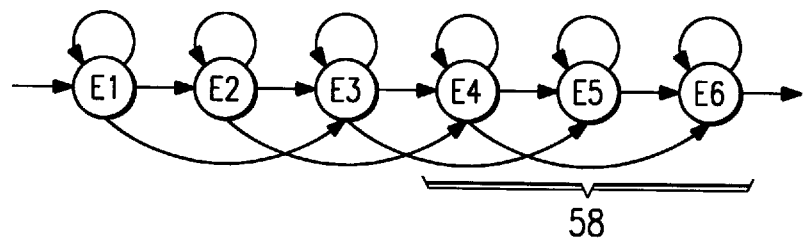
FIG. 2 is a state diagram for an example of the invention.

In FIG. 2, the HMM is shown for "eight" ($M_8$). The last three states represent the last part 58 of the "eight" model.

Figure 3:
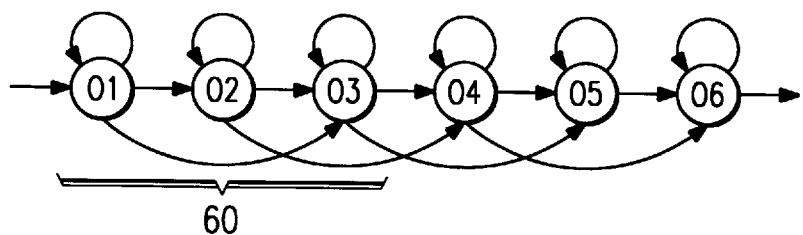
FIG. 3 is a state diagram for an example of the invention.

In FIG. 3, the HMM is shown for "oh" ($M_O$). The first three states represent the first part 60 of the "oh" model.

Figure 4:
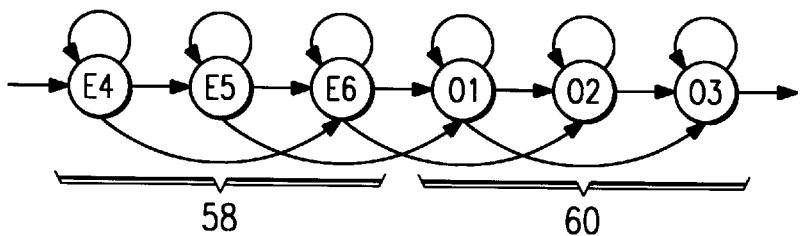
FIG. 4 is a state diagram for an example of the invention.

In FIG. 4, the resulting Middle-to-Middle HMM is shown for "eight-oh" ($MM_{8,O}$). The last part of the "eight" model 58 is combined with the first part of the "oh" model 60 to result in the model shown.

Creating a Middle-to-Middle Context Grammar

We next construct a grammar that maintains the context needed for the middle-to-middle models. Assuming that $M_s$ represents the "silence" model, this grammar has rules of the following three forms:

Start→$MM_{s,j}NT_j$ $NT_i$→$MM_{ij}NT_j$ $NT_i$→$MM_{i,s}$

Here, NT represents a nonterminal symbol of the grammar. The first and last rules require that recognition begin and end with silence, respectively. The second rule constrains recognition to the proper middle-to-middle context.

Training Initial Middle-to-Middle Models

The grammar and initial middle-to-middle HMMs are then trained using a large corpus of many speakers saying the words in the vocabulary. This can be done using HMM training algorithms well know in the present art. The resulting middle-to-middle HMMs model the acoustic coarticulatory context between words.

An embodiment of this invention could be employed for both original digit model HMMs and the middle-to-middle models utilizing the TI speech recognizer with the pooled-covariance metric assumption (e.g. G. R. Doddington, "Phonetically Sensitive Discriminants for Improved Speech Recognition", Proceedings of ICASSP '89, vol. 1, pp. 556–559, May 1989). Word model HMMs yield a digit word error rate of 3.6% (where errors include substitutions, deletions and insertions). Recognition using the middle-to-middle HMM models yields a word error rate of 2.1%. Further embodiments might employ using well known acoustic observation clustering algorithms (e.g., M. Hwang and X. Huang, "Subphonetic Modeling with Markov States-Senone", Proceedings of ICASSP '92, vol. 1, pp-33–36, March 1992) to improve statical representation and reduce the number of acoustic densities needed to represent context.

It is to be understood that the embodiments and variations shown and described herein are illustrative of the principles of this invention only and that various modifications may be implemented by those skilled in the art without departing from the scope and spirit of the invention.

There are several obvious extensions of the invention. This invention need not use HMM models, though it has been done in the preferred embodiment. One could have used templates for word models, and recognition could be performed using DTW alignment.

Figure 5:
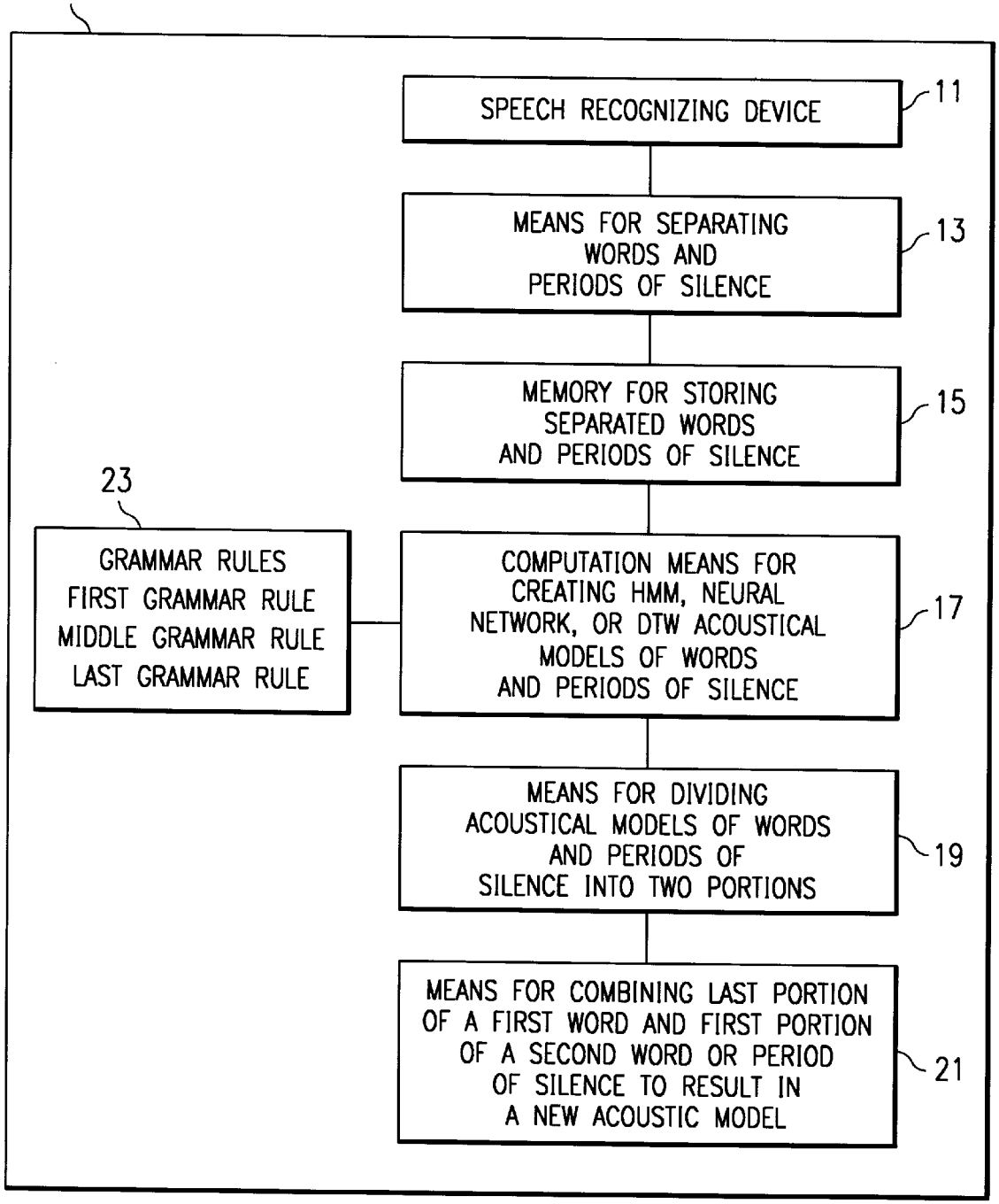
FIG. 5 is a flow chart for the invention.

The HMM topology shown in the figures is only for example purposes. This invention is applicable to any configuration of HMM topology. Referring to FIG. 5, there is shown a speech recognition system 10 including a speech recognition device 11 coupled to a means 13 for separating words and period of silence. A memory 15 stores the separated words and periods of a silence. A computational means 17 creates HMM, Neural Network, or DTW acoustical models of words and periods of silence. A means 19 divides the acoustical models of words and periods into two portions. A means 21 combines the last portion of a first word and a first portion of a second word or period of silence to result in a new acoustic model. The system 10 includes grammar rules 23 coupled to computational means 17 for combining acoustic models and wherein the acoustic models are restricted to the approximate context by the grammar rules 23. The grammar rules 23 are at least three wherein the first grammar rule starts with a silence model, a last grammar rule ends with a silence model and middle grammar rules contain non-terminal symbols that constrain a second part of an acoustic model, representing the first half of a word or period of silence, to match the first part of an adjacent acoustic model, representing the second half of said word or period of silence.

The preferred embodiment describes models of words. However, any speech unit could be modeled using this approach. Modeling at the phone level would be similar to the prior art diphone approach, but with a context grammar. Any other unit may be used.

What is claimed is:

1. A speech recognition method for modeling adjacent word context, comprising:

a. dividing a first word or period of silence into two portions;

b. dividing a second word or period of silence, adjacent to said first word or period of silence, into two portions; and c. combining last portion of said first word or period of silence and first portion of said second word or period of silence to make an acoustic model.

2. The method of claim 1, wherein said portions constitute about half of each word, and wherein each word is divided in a stable acoustic context.

3. The method of claim 1, wherein said acoustic model is restricted to the appropriate context by constructing grammar rules.

4. The method of claim 1, wherein said grammar comprises:

utilizing at least three grammar rules;

wherein a first grammar rule starts with a silence model;

wherein a last grammar rule ends with a silence model; and wherein middle grammar rule contains nonterminal symbols that constrain a second part of an acoustic model, representing the first half of a word or period of silence, to match the first part of an adjacent acoustic model, representing the second half of said word or period of silence.

5. The method of claim 1, wherein said acoustic models are created utilizing Hidden Markov Modeling techniques.

6. The method of claim 1, wherein said acoustic models are created utilizing neural network modeling techniques.

7. The method of claim 1, wherein said acoustic models are created utilizing Dynamic Time Warping Template modeling techniques.

8. A speech recognition system utilizing acoustic models for modeling adjacent word context, comprising:

a. a speech recognizing device;

b. a means for separating words and periods of silence, wherein said means for separating words is connected to said speech recognizing device;

c. a memory for storing separated words and periods of silence;

d. a computational means for creating an acoustic model of said words and periods of silence;

e. a means for dividing said acoustic models of said words and periods of silence into two portions;

f. a means for combining last portion of a first word and first portion of a second word or period of silence to result in a new acoustic model.

9. The system of claim 8, wherein said system includes grammar rules coupled to computational means for combining acoustic models.

10. The system of claim 9, wherein said acoustic models are restricted to the appropriate context by said grammar rules.

11. The system of claim 10, wherein said grammar rules comprises:

at least three grammar rules;

wherein a first grammar rule starts with a silence model; a last grammar rule ends with a silence model; and wherein middle grammar rule contains nonterminal symbols that constrain a second part of an acoustic model, representing the first half of a word or period of silence, to match the first part of an adjacent acoustic model, representing the second half of said word or period of silence.

12. The system of claim 8, wherein said system utilizes Hidden Markov Models.

13. The system of claim 8, wherein said system utilizes neural network acoustic models.

14. The system of claim 8, wherein said system utilizes Dynamic Time Warping Template models.

15. A speech recognition method for modeling adjacent word context, comprising:

a. dividing a first word or period of silence into two portions;

b. dividing a second word or period of silence, adjacent to said first word or period of silence, into two portions; said portions constitute about half of each word, and wherein each word is divided in a stable acoustic context; and c. combining last portion of said first word or period of silence and first portion of said second word or period of silence to make an acoustic model; said acoustic model is restricted to the appropriate context by constructing grammar rules; said grammar comprises:

utilizing at least three grammar rules;

wherein a first grammar rule starts with a silence model;

wherein a last grammar rule ends with a silence model; and wherein middle grammar rule contains nonterminal symbols that constrain a second part of an acoustic model, representing the first half of a word or period of silence, to match the first part of an adjacent acoustic model, representing the second half of said word or period of silence.

16. A speech recognition system utilizing acoustic models for modeling adjacent word context, comprising:

a. a speech recognizing device;

b. a means for separating words and periods of silence, wherein said means for separating words is connected to said speech recognizing device;

c. a memory for storing separated words and periods of silence;

d. a computational means for creating an acoustic model of said words and periods of silence;

e. a means for dividing said acoustic models of said words and periods of silence into two portions;

f. a means for combining last portion of a first word and first portion of a second word or period of silence to result in a new acoustic model; said system includes grammar rules coupled to computational means for combining acoustic models; said acoustic models are restricted to the appropriate context by said grammar rules; wherein said grammar rules comprises:

at least three grammar rules;

wherein a first grammar rule starts with a silence model; a last grammar rule ends with a silence model; and wherein middle grammar rule contains nonterminal symbols that constrain a second part of an acoustic model, representing the first half of a word or period of silence, to match the first part of an adjacent acoustic model, representing the second half of said word or period of silence.

* * * * *